(12) United States Patent
Field et al.

(10) Patent No.: US 10,275,743 B2
(45) Date of Patent: Apr. 30, 2019

(54) SYSTEMS AND METHODS FOR PROVIDING BAIL AND BOND SERVICES VIA A MONEY TRANSFER NETWORK

(71) Applicant: Moneygram International, Inc., Minneapolis, MN (US)

(72) Inventors: Timothy Field, Hanover, MN (US); LaVonne Lynne Engman, Saint Michael, MN (US); Kenneth James Bengtsson, Minneapolis, MN (US); Brinkley Brown Eiting, Dallas, TX (US)

(73) Assignee: Moneygram International, Inc., Minneapolis, MN (US)

(*) Notice: Subject to any disclaimer, the term of this patent is extended or adjusted under 35 U.S.C. 154(b) by 339 days.

(21) Appl. No.: 14/990,264

(22) Filed: Jan. 7, 2016

(65) Prior Publication Data
US 2017/0200136 A1 Jul. 13, 2017

(51) Int. Cl.
*G06Q 40/00* (2012.01)
*G06Q 20/10* (2012.01)

(52) U.S. Cl.
CPC ........... *G06Q 20/10* (2013.01); *G06Q 20/102* (2013.01); *G06Q 40/00* (2013.01)

(58) Field of Classification Search
CPC .................................................. G06Q 40/00
USPC ............................................................ 705/39
See application file for complete search history.

(56) References Cited

U.S. PATENT DOCUMENTS

| | | | |
|---|---|---|---|
| 2007/0156462 A1* | 7/2007 | Kazanchian | G06Q 40/08 705/4 |
| 2011/0213618 A1* | 9/2011 | Hodge | G07F 19/20 705/1.1 |
| 2012/0089498 A1* | 4/2012 | Salcedo | G06Q 40/00 705/35 |
| 2013/0332202 A1* | 12/2013 | Downs | G06Q 40/08 705/4 |
| 2017/0083878 A1* | 3/2017 | Conrad | G06Q 20/0855 |

* cited by examiner

Primary Examiner — Lindsay M Maguire
(74) Attorney, Agent, or Firm — Norton Rose Fulbright US LLP (57) ABSTRACT

Systems, methods, and computer-readable storage media for processing of bail payments and/or bond payments using resources of a money transfer network are disclosed. In an embodiment, a bail payment may be made via a money transfer transaction between a sending party (e.g., a family member or friend of a defendant) and a receiving party (e.g., the court that set the defendant's bail). In an additional or alternative embodiment, a bond payment may made via a money transfer transaction between the sending party and a receiving party (e.g., the bail bondsman entity).

18 Claims, 4 Drawing Sheets

SYSTEMS AND METHODS FOR PROVIDING BAIL AND BOND SERVICES VIA A MONEY TRANSFER NETWORK

TECHNICAL FIELD

The present disclosure relates to providing bail and bond services, and more particularly to improving money transfer networks and underlying devices for providing bail and/or bond services.

BACKGROUND

In many legal systems, a defendant (or a suspect) who has been arrested and/or placed in the custody of law enforcement may be offered bail, which typically requires the defendant to deposit some form of property (usually money) to a court in exchange for the defendant's release from custody. Bail is typically offered to the defendant with an understanding that the defendant will appear at trial (or another proceeding relating to the defendant being taken into custody by law enforcement), and that the bail will be forfeited if the defendant does not appear. In some instances, a defendant may make bail by depositing all or a portion of the bail amount with the court. The amount of the bail may be determined by the court, and is often affected by the offense that resulted in the defendant being taken into custody, the perceived flight risk of the defendant, and other factors. An alternative to posting bail is posting a bond, in which a third party (e.g., a bail bondsman entity) agrees to be responsible for payment of the bail amount if the defendant does not appear or does not otherwise fulfill the obligations of the bail.

BRIEF SUMMARY

The present disclosure is directed to systems, methods, computer-readable storage media for processing of bail payments and/or bond payments by improving the resources of a money transfer network and corresponding devices accessing the money transfer network. In an embodiment, a bail payment may be made via a money transfer transaction between a sending party (e.g., a family member or friend of the defendant) and a receiving party (e.g., the court that set the defendant's bail). In an additional or alternative embodiment, a bond payment may made via a money transfer transaction between the sending party and a receiving party (e.g., the bail bondsman entity). The receiving party (e.g., either the court or the bail bondsman entity), upon receiving a notification of the money transfer transaction, may initiate one or more actions to release the defendant from custody. For example, when the receiving party is the court, the notification may indicate that the bail payment has been made via the money transfer transaction, and the court, upon receiving the notification, may initiate one or more actions to release the defendant from custody. As another example, when the receiving party is the bail bondsman entity, the notification may indicate that the bond fee has been made to the bail bondsman entity via the money transfer transaction, and the bail bondsman entity, upon receiving the notification, may initiate one or more actions to release the defendant from custody.

In a traditional money transfer transaction, the receiving party receives a code that may be provided to the money transfer entity that provided the money transfer transaction, and, upon verifying that the code is valid, the money transfer entity may provide cash to the receiving party. Such traditional money transfer transactions would pose significant inconvenience in the context of providing bail and bond services. Accordingly, in an embodiment, the money transfer transaction may be executed as an electronic funds transfer to an account of the receiving party (e.g., an account of the court or an account of the bail bondsman entity).

Additionally, traditional money transfer transactions are performed based solely on requirements imposed on or by the money transfer entity. For example, federal regulations and laws relating to money laundering and other illicit purposes may require that money transfer entities place limits on amounts that may be transferred through money transfer transactions or other restrictions. To ensure compliance with such requirements, the money transfer entity will often require a sending party and/or a receiving party to fill out certain paperwork that may be retained by the money transfer entity for auditing and regulatory compliance purposes. However, traditional money transfer transactions do not presently require sending and/or receiving parties to authenticate and/or fill out paper work of a third party. Unlike these traditional money transfer transactions, money transfer transactions according to one or more of the embodiments disclosed herein may require that the money transfer entity obtain and authenticate one or more documents of a third party. For example, a bail bondsman entity may require the sending party to the money transfer transaction to fill out one or more forms (e.g., an indemnitor application agreement, an agreement detailing the sending party's obligations to the bail bondsman entity in exchange for the bail bondsman entity's services, a guarantor agreement detailing the costs of the bail bondsman entity's services, a credit card authorization form authorizing the bail bondsman entity to charge the sending party's credit card in relation to the bail bondsman entity's services, other forms or agreements, or a combination thereof). In accordance with an embodiment of the present disclosure, a money transfer transaction between the sending party and the bail bondsman entity may require verification that one or more of the above-described forms be completed before the money transfer transaction is executed. Additionally, in an embodiment, electronic copies of the forms may be provided to the bail bondsman entity upon initiating the money transfer transaction. In an additional or alternative embodiment, other forms, such as any forms required by the court for providing payment of bail, or forms required by the court for the posting of the bond may also be verified by the money transfer entity prior to initiating the money transfer transaction.

One or more of the techniques for processing bail and/or bond payments disclosed herein may provide significant advantages and savings when compared to traditional bail/bond services. For example, assume that the defendant is arrested or placed into custody in a first state. The defendant may contact a family member or friend, who may be in another state, and ask the family member or friend to arrange for payment of bail or posting of a bond, the sending party may visit a money transfer location. Using presently available systems for arranging payment of bail or posting of a bond, the friend or family member would have to travel to the first state and visit the court or the court's designated facility for receiving bail payments, or visit a bail bondsman entity in the first state to make arrangements for the posting of the bond. This increases the cost and inconvenience to the friend or family member who incurs travel expenses in connection with arranging for the payment of the bail or posting of the bond. Using embodiments of the present disclosure, the friend or family member may make arrangements for the payment of the bail or posting of the bond without having to travel to the first state, thereby eliminating the significant costs and inconvenience incurred by the friend or family member under the traditional methods of paying the bail or posting the bond.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of embodiments described herein, both as to its organization and method of operation, together with further objects and advantages will be better understood from the following written description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
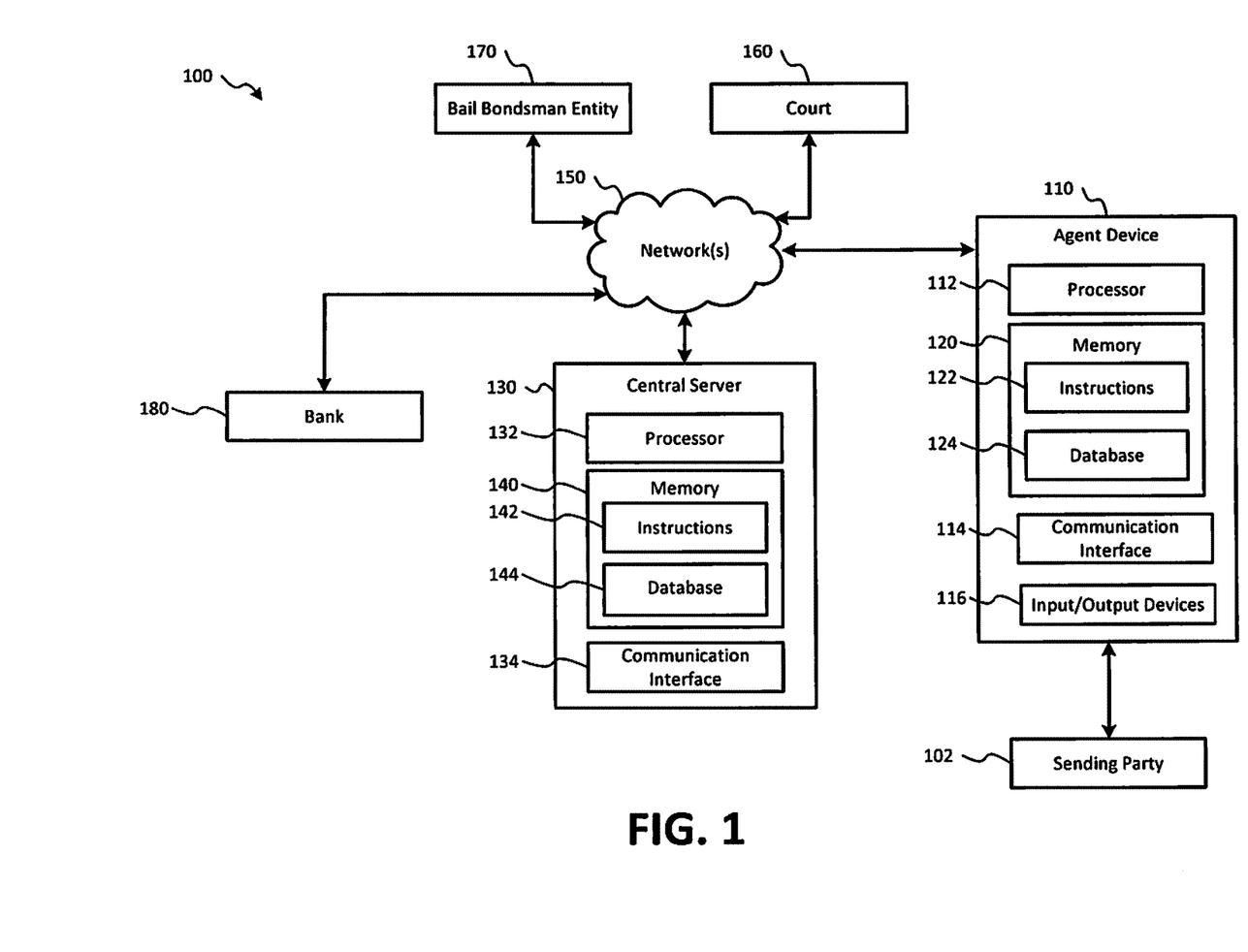
FIG. 1 is a block diagram illustrating aspects of providing bail and/or bond payments using resources of a money transfer network.

Referring to FIG. 1, a block diagram illustrating aspects of a system for providing bail and/or bond payments using resources of a money transfer network is shown as a system 100. As shown in FIG. 1, the system 100 includes an agent device 110, a central server 130, and a network 150. In an embodiment, as shown in FIG. 1, the agent device 110 and central server 130 may be communicatively coupled to a court device 160 via the network 150. In an additional or alternative embodiment, as shown in FIG. 1, the agent device 110 and central server 130 may be communicatively coupled to a bail bondsman entity device 170 via the network 150. As described in more detail below, the agent device 110 and/or central server 130 may facilitate money transfer transactions for providing bail payments to a court associated with the court device 160 and/or money transfer transactions for providing bond payments to a bail bondsman entity associated with the bail bondsman entity device 170.

As shown in FIG. 1, the agent device 110 includes a processor 112, a communication interface 114, one or more input/output (I/O) devices 116, and a memory 120. The one or more I/O devices 116 may include a keyboard, a mouse, a touch screen device, a credit card processing device, a biometric input device (e.g., fingerprint scanner, retina scanner, etc.), a receipt printer, another form of printer, a barcode scanner, and the like. In an embodiment, the memory 120 may store instructions 122 that, when executed by the processor 112, cause the processor 112 to perform operations for providing bail and/or bond payments using resources of a money transfer network, such as the network 150. Additionally, in an embodiment, the memory 120 may store a database 124. The database 124 may store information that is used to facilitate the provisioning of money transfer transactions in connection with a surety payment (e.g., a bail payment or a bond payment) using resources of the money transfer network, as described in more detail below. It is noted that although the database 124 is shown as being stored at the memory 120, in additional or alternative embodiments, the database 124 may be stored at a memory that is external to the agent device 110, such as at a network attached storage device on a local area network (LAN) of the physical money transfer location, an external storage device coupled to the agent device 110, or another storage device accessible to the agent device 110 either locally or via the network 150. In an embodiment, the agent device 110 may be an electronic device, such as a point of sale device, a computer, etc., located at a physical money transfer location operated by a money transfer entity.

As shown in FIG. 1, the central server 130 includes a processor 132, a communication interface 134, and a memory 140. In an embodiment, the memory 140 may store instructions 142 that, when executed by the processor 132, cause the processor 132 to perform operations for providing bail and/or bond payments using resources of a money transfer network, such as the network 150. Additionally, in an embodiment, the memory 140 may store a database 144. The database 144 may store information that is used to facilitate the provisioning of money transfer transactions in connection with a surety payment (e.g., a bail payment or a bond payment) using resources of the money transfer network, as described in more detail below. It is noted that although the database 144 is shown as being stored at the memory 140, in additional or alternative embodiments, the database 144 may be stored at a memory that is external to the central server 130, such as at a network attached storage device, an external storage device coupled to the central server 130, or another storage device that is otherwise accessible to the central server 130 either locally or via the network 150.

During operation, a sending party 102 may visit a money transfer agent location and request a money transfer transaction in connection with providing a surety payment (e.g., a bail payment or a bond payment). A money transfer agent (e.g., employee of the money transfer agent location) may provide inputs to the agent device 110 to initiate setup of the money transfer transaction. The inputs provided to the agent device 110 may include information such as the name of a defendant for which the surety payment is being made, the bail amount, a case number that identifies the defendant's case before the court that set the bail amount, a surety payment type (e.g., either a bail payment or a bond payment).

In an embodiment, the agent device 110 may prompt the money transfer agent to identify a particular entity that is to be a receiving party for the money transfer transaction (e.g., the entity that is to receive funds in connection with the surety payment). For example, when the surety payment type is the bail payment type, the receiving party for the money transfer transaction may be a court (e.g., the court associated with the court device 170). As another example, when the surety payment type is the bond payment type, the receiving party for the money transfer transaction may be a bail bondsman entity (e.g., the bail bondsman entity associated with the bail bondsman entity device 170). In an embodiment, the database 124 may store information associated with one or more entities (e.g., one or more bail bondsman entities and one or more courts) that have established a relationship with the money transfer entity for receiving surety payments via money transfer transactions. The information associated with the one or more entities may include account information for each of the one or more entities, where the account information identifies a bank account at a bank, such as the bank 180 of FIG. 1, where funds provided in connection with making the surety payment via the money transfer transaction may be deposited on behalf of the receiving party. In an embodiment, the account information may be stored external to the agent device 110, such as at the database 144 of the central server 130 to provide improved data security. In an embodiment, the information associated with the one or more entities may include contact information for the respective entities, address information for the respective entities, one or more forms (e.g., an indemnitor application agreement, an agreement detailing the sending party's obligations to the bail bondsman entity in exchange for the bail bondsman entity's services, a guarantor agreement detailing the costs of the bail bondsman entity's services, a credit card authorization form authorizing the bail bondsman entity to charge the sending party's credit card in relation to the bail bondsman entity's services, other forms or agreements, or a combination thereof) required for providing surety payments to the respective entities via money transfer transactions, and the like. In an additional or alternative embodiment, the one or more documents or forms to be filled out may be retrieved from a database associated with the receiving party device (e.g., the court device 160 or the bail bondsman entity device 170).

In an embodiment, the prompt may present a filtered list of entities authorized for receiving surety payments via money transfer transactions. For example, the inputs provided to the agent device 110 may indicate a city and state where the receiving party to the money transfer transaction is located, and the agent device 110 may prompt the money transfer agent with a list of entities in the designated city and state that are authorized for receiving surety payments via money transfer transactions. The money transfer agent may then select one of the entities as the receiving party to the money transfer transaction, or may allow the sending party to select the receiving party from the list provided by the prompt. In an embodiment, the sending party may stage the money transfer transaction prior to visiting the money transfer agent location (e.g., using a mobile application or website provided by the money transfer entity), or may use a kiosk (not shown in FIG. 1) provided at the money transfer agent location to stage the transaction. Staging the transaction may reduce the amount of time that the sending party 102 spends interacting with the money transfer agent. For example, during the staging process, the sending party 102 may be prompted to fill out the one or more forms electronically. As another example, during the staging process, the sending party 102 may be provide with information indicating various fees charged by the respective entities for providing services in connection with receiving the surety payment via a money transfer transaction, and may select the receiving party accordingly. In an embodiment, the information associated with the fees may also be presented in the prompt described above. In yet another embodiment, the transaction may be staged and funded using a mobile application and transaction information may be sent to the money transfer network via the mobile device.

Once the receiving party has been designated by the sending party, the agent device 110 may determine one or more requirements corresponding to the surety payment. In an embodiment, the one or more requirements may be based, at least in party on the surety payment type. For example, when the surety payment type is the bond payment type, the agent device 110 may determine one or more requirements for the bond payment. In an embodiment, this may include retrieving one or more documents or forms that are to be filled out in connection with providing the surety payment, as described above. In an embodiment, the one or more requirements may be further determined based on the receiving party designated by the sending party. For example, there may be one or more requirements that are common to all potential receiving parties in connection with receiving surety payments via money transfer transactions, and then each respective entity may further have their own specific requirements (e.g., certain forms that are to be filled out, etc.) for providing services in connection with the surety payment. In an embodiment, the one or more requirements may be determined based on information stored at the database 124 or the database 144. In an additional or alternative embodiment, the one or more requirements may be determined based on information stored in a remote database, such as a database associated with the court device 160 or the bail bondsman entity device 170. In an embodiment, the agent device 110 may print one or more documents or forms for the sending party 102 to fill out.

Subsequently, the sending party 102 may provide payment (e.g., cash, a credit card or debit card, a bank account number to be used for an electronic funds transfer, etc.) to the money transfer agent. The agent device 110 may receive an input indicating the monetary amount of the payment provided by the sending party 102 for funding the surety payment. In an embodiment, the monetary amount may be less than the bail amount when the surety payment type is the bond payment type. For example, bail bondsman entities typically require payment of ten percent (10%) of the bail amount or more as a fee for providing the bail bondsman services (i.e., for bailing defendants out of custody). In an additional or alternative embodiment, the monetary amount may at least equal to the bail amount when the surety payment type is the bail payment type. For example, courts may require that the defendant seeking to make bail pay the bail amount in full, and then, if the defendant satisfies all of the conditions of the bail, may return all or a portion of the bail amount to the defendant. It is noted that in some instances the court may not require the full bail amount, and in such instances, the monetary amount provided by the sending party 102 may be less than the bail amount. Prior to initiating the money transfer transaction, a validation may be performed to determine whether the one or more requirements are satisfied. In an embodiment, the agent device 110 may prompt the money transfer agent with a list of the one or more requirements, and the money transfer agent may provide inputs indicating that each of the one or more requirements has been satisfied. For example, the one or more requirements may include a requirement that the sending party fill out one or more forms, and the validation may include determining whether the one or more documents have been filled out properly. If the money transfer transaction has been previously staged, as described above, the agent device 110 or the central server 130 may validate that the forms are properly filled out, and, if properly filled out, may print the electronically filled out forms. The money transfer agent may then provide the forms to the sending party for signature. If one or more of the forms are not filled out properly (e.g., is incomplete, etc.), the agent device 110 may prompt the money transfer agent with information indicating the deficiencies in the one or more forms, and may enable the money transfer gent to provide inputs at the direction of the sending party 102 to properly fill out the forms, or the money transfer agent may direct the sending party 102 to a kiosk to finish filling out the forms. If the one or more requirements require that one or more documents (e.g., documents outlining the services to be provided, the terms and conditions of the money transfer transaction, terms and conditions of the services provided by the receiving party, etc.) be provided to the receiving party, the money transfer agent may initiate printing of those documents, and provide an input to the agent device 110 indicating that the one or more documents have been provided to the sending party. In an additional or alternative embodiment, the request to initiate the money transfer transaction may include an e-mail address of the sending party, and the agent device 110 may automatically initiate transmission of an e-mail including the one or more documents to the sending party.

In response to validating that the one or more requirements are satisfied, the agent device 110 may initiate the money transfer transaction between the sending party 102 and the receiving party to provide the surety payment to the receiving party. Additionally, the agent device 110 may send a notification to the receiving party that indicates the surety payment has been made. In an embodiment, the notification to the receiving party may include the case number included in the request, and which identifies the defendants case before the court. The receiving party, upon receiving the notification, may initiate operations to release the defendant from custody. In an embodiment, the money transfer transaction may provide the surety payment funds to a bank account of the receiving party, such as an account at the bank 180. In some embodiments however, the receiving party may obtain the funds associated with the surety payment by visiting a money transfer agent location local to the receiving party. For example, a bail bondsman entity may prefer to receive cash payment from the sending party. In such instances, the notification to the receiving party may include a code that the receiving party may provide to a local money transfer agent location to receive the funds of the money transfer transaction initiated by the sending party 102. In an embodiment, the ability to receive the funds of the money transfer transaction as cash may be restricted based on the amount of the surety payment. For example, surety payments exceeding a threshold amount may be required to be provided to an account of a bank, such as the bank 180. The threshold amount may be determined based on limits imposed by the money transfer entity, limits imposed by the designated receiving, limits imposed by government regulations, or a combination thereof. In an embodiment, electronic copies of the one or more documents (or forms) that have been filled out by the sending party 102 may be provided to the receiving party in response to, or as part of, initiating the money transfer transaction.

Additionally, in response to the validation, the agent device 110 may generate a send receipt that is provided to the sending party 102. The send receipt may include information confirming the monetary amount used to fund the money transfer transaction, an amount of funds provided to receiving party in connection with the money transfer transaction, one or more fees charged by the money transfer entity for providing the money transfer transaction, a confirmation number identifying the money transfer transaction, the case number, and/or other information. In an embodiment, the send receipt may further include contact information for the receiving party and/or contact information for the court. In an embodiment, the agent device 110 and/or the central server 130 may be integrated with information systems of one or more courts, such as the court associated with the court device 160. This integration may enable the agent device 110 to retrieve information from the various court systems. For example, the integration may enable the agent device 110 to retrieve information that identifies a facility where the defendant is held in custody, contact information for the facility, and the like. In an embodiment, the send receipt may include contact information for the facility where the defendant is being held in custody, such as a jail or other facility. In an embodiment, the agent device 110 or the central server 130 may send a second notification to the facility where the defendant is being held to notify the facility that the defendant has been bailed out, which may put the facility on notice that the defendant is to be released pending confirmation from the court. This may reduce delays associated with releasing the defendant. As another example, the integration may interface the agent device 110 with a payment system provided by the court, which may enable the money transfer entity to provide the surety payment (e.g., the money transfer transaction) to the court via the court's payment system.

In an embodiment, upon receiving the electronic copies of the one or more documents or forms, the receiving party may verify that all of the documents and/or forms have been properly completed, and may send a return notification to the money transfer entity (e.g., such as a notification to the central server 130). The return notification may indicate an expected time of release, contact information for the facility where the defendant is to be released from, conditions of the defendant's release (e.g., when the defendant is to appear before the court, etc.), or other information. In an embodiment, the central server 130, or another device operated by the money transfer entity, may send an update to the sending party 102 that includes the information included in the return notification. This may enable the sending party 102 to more easily make arrangements for the defendant to be picked up upon release when the defendant is being held in custody in a remote city or state relative to the sending party 102.

Figure 2:
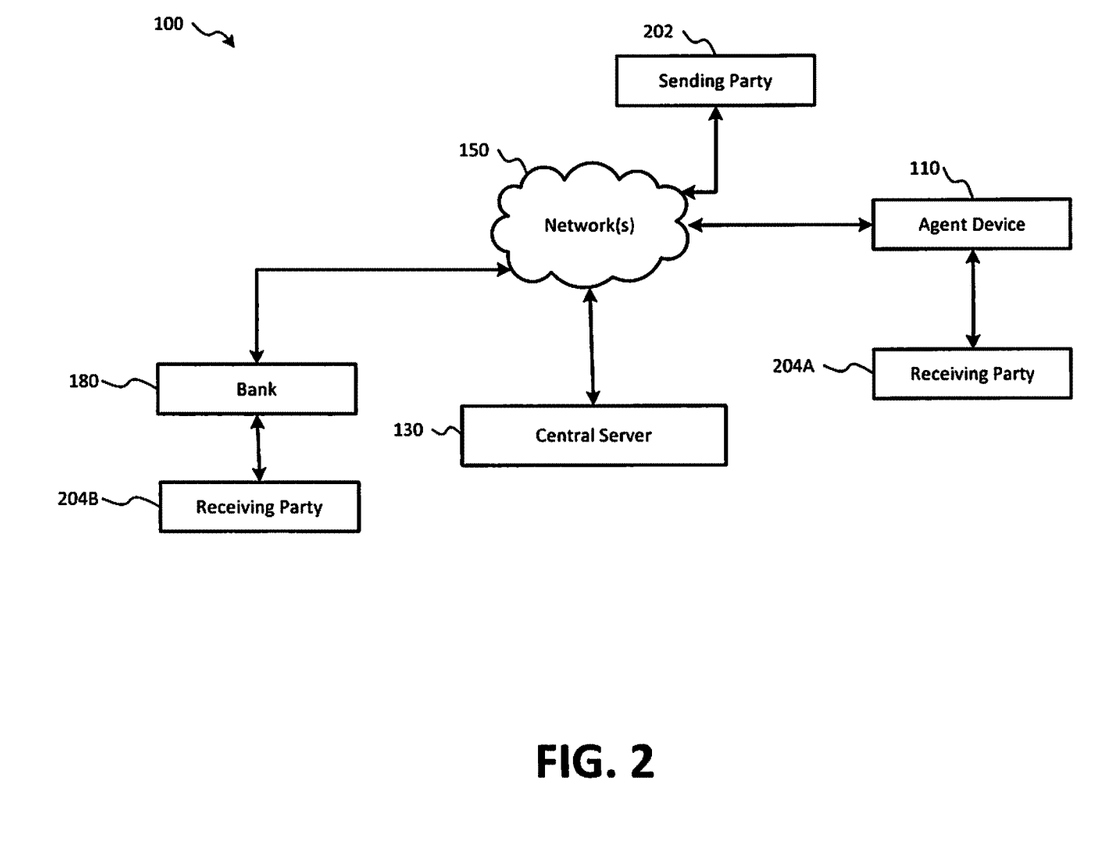
FIG. 2 is a block diagram illustrating additional aspects of a system for providing bail and/or bond payments using resources of a money transfer network.

Referring to FIG. 2, a block diagram illustrating additional aspects of a system for providing bail and/or bond payments using resources of a money transfer network is shown. In FIG. 2, the agent device 110, the central server 130, the bank 180, and the network 150 of FIG. 1 are shown. Additionally, a sending party 202 and a receiving party 204 are shown. In FIG. 2, it is assumed that a surety payment has been made using the resources of the money transfer network according to one or more of the embodiments described above with reference to FIG. 1. After a defendant has satisfied the conditions of his release on bail, or, in some circumstances, release on bond, all or a portion of the surety payment may be returned to the party that paid surety payment (e.g., the sending party 102 of FIG. 1). Thus, in an embodiment, the receiving party 204 of FIG. 2 corresponds to the sending party 102 of FIG. 1, and the sending party 202 of FIG. 2 corresponds to the entity (e.g., the bail bondsman entity or the court) that received the surety payment described above with reference to FIG. 1.

During operation, the money transfer entity may receive a request to initiate a money transfer transaction to return at least a portion of the surety payment to receiving party 202. In an embodiment, the request may be received from a device of the sending party (e.g., the court device 160 or the bail bondsman entity device 170) in response to a determination that the defendant has satisfied one or more conditions associated with the surety payment. In an embodiment, the money transfer transaction of FIG. 2 may be funded using the payment system of the court. For example, when the sending party 202 is the court, the court's payment system, which may be integrated with the money transfer network entity as described with reference to FIG. 1, may provide information for funding the money transfer transaction to a device (e.g., the central server 130) of the money transfer entity. In an additional or alternative embodiment, the money transfer transaction of FIG. 2 may be funded by the sending party 202 visiting a money transfer location of the money transfer entity. In still another additional or alternative embodiment, the money transfer transaction of FIG. 2 may be funded by the sending party 202 via a web page or mobile application provided by the money transfer entity. After receiving the funds for the money transfer transaction, the central server 130, or another device of the money transfer entity, may generate a send receipt that is provided to the sending party 202.

In an embodiment, the central server 130, or another device of the money transfer entity, may generate a receive receipt that is provided to the receiving party 204 in connection with initiating the money transfer transaction of FIG. 2. In an embodiment, the receive receipt may include a reference number or code that the receiving party 204 may use to receive funds in connection with the money transfer transaction of FIG. 2. For example, as shown in FIG. 2, at 204 A, the receiving party 204 may visit a money transfer agent location and provide the reference number (or code) the a money transfer agent, who may then provide the reference number as an input to the agent device 110. Upon receiving the input, the agent device 110 may determine whether the reference number is a valid reference number. In an embodiment, the reference number may be determined as valid based on information stored at the database 124 or the database 144. In response to a determination that the reference number is a valid reference number, the money transfer agent operating the agent device 110 may provide an amount of funds corresponding to the money transfer transaction to the receiving party 204A. In an embodiment, the amount of funds may be at least the portion of the surety payment made in FIG. 1. In an embodiment, the reference number may be provided on the send receipt described with reference to FIG. 1, rather than on a receive receipt. In this instance, the money transfer entity may send a notification to the receiving party 204 that funds are available for pickup by the receiving party 204, and the receiving party 204 may use the reference number on the send receipt to receive the funds in a manner similar to that described above.

In an additional or alternative embodiment, the central server 130, or another device of the money transfer entity, may determine whether the funding amount for the money transfer transaction of FIG. 2 satisfies a threshold amount, and, in response to a determination that the funding amount satisfies the threshold amount, may initiating the money transfer transaction as an electronic funds transfer to an account associated with the receiving party 204. For example, in response to a determination that the funding amount satisfies the threshold amount, the funds of the money transfer transaction may deposited electronically into a bank account of the sending party 204, such as a bank account at the bank 180, and the sending party 204 may obtain the funds, if desired, by visiting the bank, as indicated at 204A.

In an embodiment, the money transfer entity may charge one or more fees in exchange for facilitating the surety payments and return payments described in connection with FIGS. 1 and 2. In an embodiment, the fees charged by the money transfer entity may include a sending party fee charged for the money transfer transaction of FIG. 1. In an additional or alternative embodiment, the fees charged by the money transfer entity may include a receiving party fee charged for the money transfer transaction of FIG. 2. In an embodiment, the receiving party fee may be charged at the time initiating the money transfer transaction of FIG. 1. In an additional or alternative embodiment, the receiving party fee may be deducted from the funds of the money transfer transaction of FIG. 2. This may be beneficial as it may reduce the need to refund the receiving party fee is the defendant does not satisfy the conditions of his or her release on bail/bond.

The various embodiments described with reference to FIGS. 1 and 2 provide several improvements to the process of posting bail and/or bond. For example, as explained above, the various embodiments described with reference to FIG. 1 enable the sending party 102 to arrange for and make bail/bond payments to remote locations (e.g., cities and states remote to where the sending party 102 is located), thereby reducing the costs to the sending party 102 for making the arrangements (e.g., because the sending party 102 does not have to travel to the location where the defendant is being held in custody to make the arrangements). Additionally, providing bail payments using the money transfer network eliminates the need for the court to process the payments. Further, when the party making the surety payment is remote to the defendant, one or more of the embodiments disclosed herein may result in that party receiving a refund (e.g., the money transfer transaction of FIG. 2) more quickly.

Figure 3:
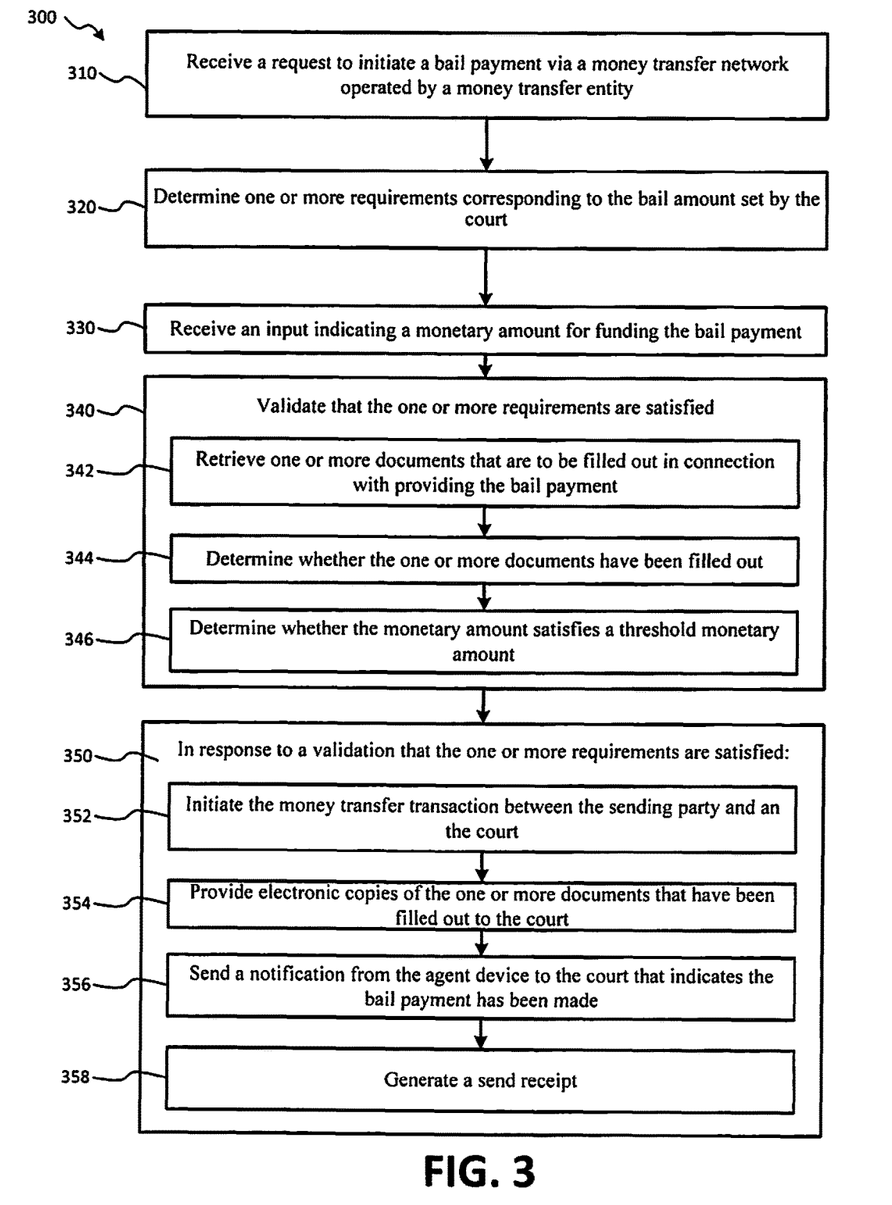
FIG. 3 is a flow diagram illustrating aspects of providing bail payments using resources of a money transfer network.

Referring to FIG. 3, a flow diagram illustrating an exemplary embodiment of a method for providing bail payments using resources of a money transfer network is shown as a method 300. In an embodiment, the method 300 may be performed by the agent device 110 of FIGS. 1 and 2, the central server 130 of FIGS. 1 and 2, or a combination thereof. In an embodiment, the instructions 122 and/or 142 may include instructions that, when executed by the processors 112 and 132, respectively, cause the processors to perform the operations of the method 300.

At 310, the method 300 includes receiving a request to initiate the bail payment via a money transfer network operated by the money transfer entity. In an embodiment, the request may include information indicating: a name of a defendant for which the bail payment is being made, the bail amount, a case number that identifies the defendant's case before the court that set the bail amount, or other information, as described above with reference to FIGS. 1 and 2. At 320, the method 300 includes determining one or more requirements corresponding to the bail amount set by the court. In an embodiment, this may include retrieving one or more documents from a database (e.g., the database 124 and/or 144 of FIG. 1, or a database associated with the court). At 330, the method 300 includes receiving an input indicating a monetary amount for funding the bail payment. The monetary amount may be received from the sending party. In an embodiment, the monetary amount may be provided as cash. In an additional or alternative embodiment, the monetary amount may be provided via an electronic payment using a credit card, a debit card, an electronic funds transfer, or another form of electronic payment.

At 340, the method 300 includes validating that the one or more requirements are satisfied. In an embodiment, validating that the one or more requirements are satisfied may include, at 342, retrieving one or more documents that are to be filled out in connection with providing the bail payment, and, at 344, determining whether the one or more documents have been filled out. In an embodiment, validating that the one or more requirements are satisfied may include, at 346, determining whether the monetary amount satisfies a threshold monetary amount. For example, if the bail amount is set at $2,000, and the court requires that the bail payment be at least fifty percent (50%) of the bail amount, then the validating may verify that the monetary amount is at least $1,000. In an embodiment, when the monetary amount satisfies the threshold monetary amount, the money transfer transaction may deposit the funds in an account (e.g., a bank account) of the court. For example, bail payments involving large monetary amounts (e.g., $5,000 or more) may be required to be deposited to a bank account.

In response to a validation that the one or more requirements are satisfied, at 350, the method 300 includes, at 352, initiating the money transfer transaction between the sending party and the court, and includes, at 354, providing electronic copies of the one or more documents that have been filled out to the court, and includes, at 356, sending a notification from the agent device to the court that indicates the bail payment has been made, and includes, at 358, generating a send receipt. In an embodiment, the court may initiate operations to release the defendant from custody in response to receiving the notification. In an embodiment, the send receipt includes information confirming the monetary amount used to fund the money transfer transaction, an amount of funds provided to account associated with the court in connection with the money transfer transaction, one or more fees charged by the money transfer agent in connection with the money transfer transaction, a confirmation number identifying the money transfer transaction, and the case number. The send receipt may be provided to the sending party. Although not illustrated in FIG. 3, in some embodiments, the method 300 may include operations for facilitating a return money transfer transaction, such as the money transfer transaction described with reference to FIG. 2.

Figure 4:
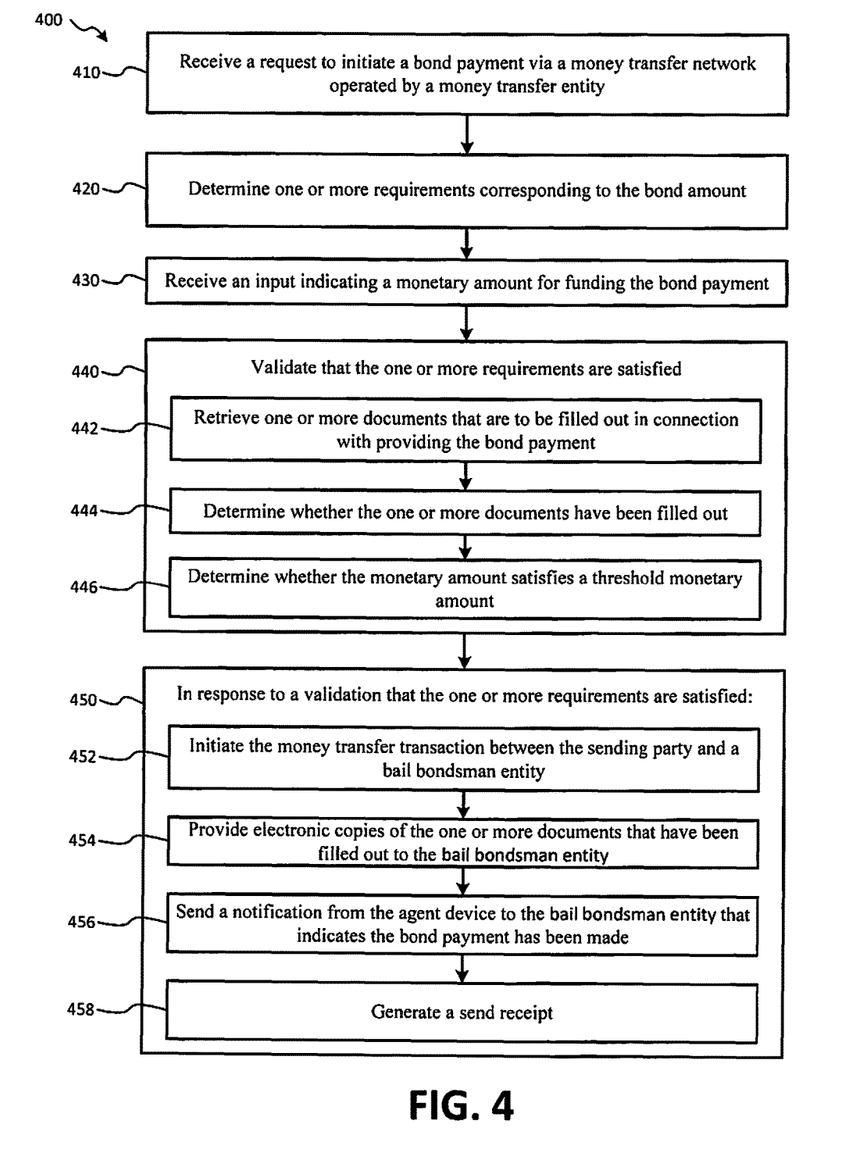
FIG. 4 is a flow diagram illustrating aspects of providing bond payments using resources of a money transfer network.

FIG. 4 is a flow diagram illustrating an exemplary embodiment of a method for providing bond payments using resources of a money transfer network is shown as a method 400. In an embodiment, the method 400 may be performed by the agent device 110 of FIGS. 1 and 2, the central server 130 of FIGS. 1 and 2, or a combination thereof. In an embodiment, the instructions 122 and/or 142 may include instructions that, when executed by the processors 112 and 132, respectively, cause the processors to perform the operations of the method 400.

At 410, the method 400 includes receiving a request to initiate the bail payment via a money transfer network operated by the money transfer entity. In an embodiment, the request may include information indicating: a name of a defendant for which the bail payment is being made, the bail amount, a case number that identifies the defendant's case before the court that set the bail amount, or other information, as described above with reference to FIGS. 1 and 2. In an embodiment, a bail bondsmen entity may be identified in the request, or may be identified as described with reference to FIG. 1, and the method 400 may include determining whether the bail bondsman entity indicated in the request is authorized to receive the bond payment via the money transfer network. The request may be denied in response to a determination that the bail bondsman entity indicated in the request is not authorized to receive the bond payment via the money transfer network, and the money transfer transaction may be processed (or initiated) in response to a determination that the bail bondsman entity indicated in the request is authorized to receive the bond payment via the money transfer network. At 420, the method 400 includes determining one or more requirements corresponding to the bond amount as set by the bail bondsman entity. In an embodiment, this may include retrieving one or more documents from a database (e.g., the database 124 and/or 144 of FIG. 1, or a database associated with the bail bondsman entity). At 430, the method 400 includes receiving an input indicating a monetary amount for funding the bond payment. The monetary amount may be received from the sending party. In an embodiment, the monetary amount may be provided as cash. In an additional or alternative embodiment, the monetary amount may be provided via an electronic payment using a credit card, a debit card, an electronic funds transfer, or another form of electronic payment.

At 440, the method 400 includes validating that the one or more requirements are satisfied. In an embodiment, validating that the one or more requirements are satisfied may include, at 442, retrieving one or more documents that are to be filled out in connection with providing the bond payment, and, at 444, determining whether the one or more documents have been filled out. In an embodiment, validating that the one or more requirements are satisfied may include, at 446, determining whether the monetary amount satisfies a threshold monetary amount. For example, if the bail amount is set at $2,000, and the bail bondsman entity requires that the bond payment be at least ten percent (10%) of the bail amount, then the validating may verify that the monetary amount is at least $200. In an embodiment, when the monetary amount satisfies the threshold monetary amount, the money transfer transaction may deposit the funds in an account (e.g., a bank account) of the bail bondsman entity. For example, bond payments involving large monetary amounts (e.g., $5,000 or more) may be required to be deposited to a bank account.

In response to a validation that the one or more requirements are satisfied, at 450, the method 400 includes, at 452, initiating the money transfer transaction between the sending party and the bail bondsman entity, and includes, at 454, providing electronic copies of the one or more documents that have been filled out to the bail bondsman entity, and includes, at 456, sending a notification from the agent device to the bail bondsman entity that indicates the bond payment has been made, and includes, at 458, generating a send receipt. In an embodiment, the bail bondsman entity may initiate operations to release the defendant from custody in response to receiving the notification. In an embodiment, the send receipt includes information confirming the monetary amount used to fund the money transfer transaction, an amount of funds provided to account associated with the bail bondsman entity in connection with the money transfer transaction, one or more fees charged by the money transfer agent in connection with the money transfer transaction, a confirmation number identifying the money transfer transaction, and the case number. The send receipt may be provided to the sending party. Although not illustrated in FIG. 4, in some embodiments, the method 400 may include operations for facilitating a return money transfer transaction, such as the money transfer transaction described with reference to FIG. 2.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for providing a surety payment in connection with a bail amount set by a court via a computer-based money transfer network operated by a money transfer entity, the method comprising:
   inputting, at a computer-based agent device of the money transfer entity, a request to initiate the surety payment via the money transfer network, wherein the request includes information indicating: a name of a defendant for which the surety payment is being made, the bail amount, a case number that identifies a case for the defendant before the court that set the bail amount, and a surety payment type, and wherein the surety payment type indicates whether the surety payment is one of a bail payment type or a bond payment type;
   accessing, by the agent device, a database storing information associated with one or more entities for receiving surety payments via the money transfer network, wherein the information includes, for respective entities of the one or more entities, account information and one or more documents required for providing surety payments by the respective entities;
   determining, by the agent device, one or more requirements corresponding to the surety payment based on the surety payment type, wherein the one or more requirements includes completion of the one or more documents required for providing surety payments by a receiving party for the surety payment;
   receiving, by the agent device, an input indicating a monetary amount for funding the surety payment, wherein the monetary amount is received from a sending party;
   validating, by the agent device, that the one or more requirements are satisfied based, at least in part, on the information included in the request and the monetary amount, wherein the validating includes prompting a money transfer agent associated with the agent device with a list of the one or more requirements and receiving input from the money transfer agent that the one or more requirements have been satisfied including that the one or more documents required for providing surety payments by the receiving party accessed from the database have been filled out properly;
   in response to a validation that the one or more requirements are satisfied, initiating, by the agent device, a money transfer transaction between the sending party and the receiving party, wherein the money transfer transaction provides the surety payment to an account of the receiving party indicated in the information of the database accessed by the agent device;
   sending, by the agent device to a computer-based device of the receiving party, a notification and completed instances of the one or more documents required for providing surety payments by the receiving party accessed from the database, wherein the notification indicates the surety payment has been made, wherein the completed instances of the one or more documents are the one or more documents validated by the money transfer agent as having been filled out properly, and wherein the receiving party initiates operations to release the defendant from custody in response to the notification; and
   generating a send receipt that includes information confirming the monetary amount used to fund the money transfer transaction, an amount of funds provided to receiving party in connection with the money transfer transaction, one or more fees charged by the money transfer entity for providing the money transfer transaction, a confirmation number identifying the money transfer transaction, and the case number, wherein the send receipt is provided to the sending party.

2. The method of claim 1, wherein the monetary amount is at least equal to the bail amount when the surety payment type is the bail payment type.

3. The method of claim 1, wherein the monetary amount is less than the bail amount when the surety payment type is the bond payment type.

4. The method of claim 1, wherein the receiving party is the court, and wherein the database is associated with the court.

5. The method of claim 1, wherein the receiving party is a bail bondsman entity, and wherein the database is associated with the bail bondsman entity.

6. The method of claim 1, wherein the receiving party is the court, wherein the agent device is configured to interface with a payment system provided by the court, and wherein the money transfer transaction provides the surety payment to the payment system provided by the court.

7. The method of claim 6, further comprising:
   initiating, by the money transfer entity, a second money transfer transaction to return at least a portion of the surety payment to a second receiving party in response to a determination that the defendant has satisfied one or more conditions associated with the surety payment, wherein the second money transfer transaction is between the payment system and the second receiving party;
   receiving funds in connection with the second money transfer transaction;
   receiving an input including a reference number corresponding to the second money transfer transaction, wherein the reference number is provided by the second receiving party;
   determining whether the reference number is a valid reference number; and in response to a determination that the reference number is a valid reference number, providing an amount of funds corresponding to at least the portion of the surety payment to the second receiving party.

8. The method of claim 1, further comprising:
receiving, at a device of the money transfer entity, a request to initiate a second money transfer transaction to return at least a portion of the surety payment to a second receiving party, wherein the request to initiate the second money transfer transaction is transmitted in response to a determination that the defendant has satisfied one or more conditions associated with the surety payment;
determining whether at least the portion of the surety payment satisfies a threshold amount; and
initiating the second money transfer transaction as an electronic funds transfer to an account associated with the second receiving party in response to a determination that at least the portion of the surety payment satisfies the threshold amount, wherein an amount of the electronic funds transfer is based on at least the portion of the surety payment.

9. The method of claim 8, further comprising:
initiating the second money transfer transaction as a transfer to cash money transaction in response to a determination that at least the portion of the surety payment does not satisfy the threshold amount, wherein the transfer to cash money transfer transaction includes receiving an amount electronically, and providing the amount of funds to the second receiving party as cash, wherein the amount of funds provided to the second receiving party is based on at least the portion of the surety payment;
receiving an input including a reference number corresponding to the second money transfer transaction, wherein the reference number is provided by a receiving party;
determining whether the reference number is a valid reference number; and
in response to a determination that the reference number is a valid reference number, providing the amount of funds to the second receiving party as cash.

10. The method of claim 1, wherein the fees charged by the money transfer entity in connection with the money transfer transaction include a sending party fee charged for the money transfer transaction, and a receiving party fee charged for returning at least a portion of the surety payment to a receiving party in response to a determination that the defendant has satisfied one or more conditions associated with the surety payment.

11. A non-transitory computer-readable storage medium storing instructions that, when executed by a processor, cause the processor to perform operations for providing a bail payment in connection with a bail amount set by a court via a computer-based money transfer network operated by a money transfer entity, the operations comprising:
inputting a request to initiate the bail payment via a money transfer network operated by the money transfer entity, wherein the request includes information indicating: a name of a defendant for which the bail payment is being made, the bail amount, and a case number that identifies a case for the defendant before the court that set the bail amount;
accessing a database storing information associated with the court for receiving bail payments via the money transfer network, wherein the information includes account information for the court and one or more documents required for providing bail payments by the court;
determining one or more requirements corresponding to the bail amount set by the court, wherein the one or more requirements includes completion of the one or more documents required for providing a bail payment by the court;
receiving an input indicating a monetary amount for funding the bail payment, wherein the monetary amount is received from a sending party;
validating that the one or more requirements are satisfied based on the information included in the request and the monetary amount, wherein the validating includes:
retrieving the one or more documents that are required for providing bail payments to be filled out in connection with providing the bail payment;
prompting a money transfer agent with a list of the one or more requirements;
determining whether the one or more documents have been filled out;
receiving input from the money transfer agent that the one or more requirements have been satisfied including that the one or more documents required for providing bail payment by the court have been filled out properly; and
in response to a validation that the one or more requirements are satisfied:
initiating a money transfer transaction between the sending party and the court, wherein the money transfer transaction provides the bail payment to an account of the court indicated in the information of the database;
providing electronic copies of the one or more documents that have been filled out to the court;
sending a notification and completed instances of the one or more documents required for providing bail payments to the court, wherein the notification indicates the bail payment has been made, wherein the completed instances of the one or more documents are the one or more documents validated by the money transfer agent as having been filled out properly, wherein the court initiates operations to release the defendant from custody in response to the notification; and
generating a send receipt that includes information confirming the monetary amount used to fund the money transfer transaction, an amount of funds provided to account associated with the court in connection with the money transfer transaction, one or more fees charged by the money transfer entity in connection with the money transfer transaction, a confirmation number identifying the money transfer transaction, and the case number, wherein the send receipt is provided to the sending party.

12. The non-transitory computer-readable storage medium of claim 11, wherein the monetary amount is at least equal to the bail amount.

13. The non-transitory computer-readable storage medium of claim 11, wherein the one or more documents are retrieved from a database associated with the court.

14. The non-transitory computer-readable storage medium of claim 11, the operations further comprising:
receiving, at a device of the money transfer entity, a request to initiate a second money transfer transaction to return at least a portion of the bail payment to a receiving party in response to a determination that the defendant has satisfied one or more conditions associated with the bail payment;

determining whether at least the portion of the bail payment satisfies a threshold amount; and initiating the second money transfer transaction based on a determination of whether at least the portion of the bail payment satisfies the threshold amount, wherein, funds associated with the second money transfer transaction are provided to an account associated with the receiving party in response to a determination that at least the portion of the bail payment satisfies the threshold amount, and wherein the funds associated with the second money transfer transaction are provided to the receiving party at a money transfer location in response to a determination that at least the portion of the bail payment does not satisfy the threshold amount.

15. A non-transitory computer-readable storage medium storing instructions that, when executed by a processor, cause the processor to perform operations for providing a bond payment in connection with a bail amount set by a court via a computer-based money transfer network operated by a money transfer entity, the operations comprising:

inputting a request to initiate the bond payment via a money transfer network operated by the money transfer entity, wherein the request includes information indicating: a name of a defendant for which the bond payment is being made, the bail amount, a case number that identifies a case for the defendant before the court that set the bail amount, a bond amount, and a bail bondsman entity;

accessing a database storing information associated with the bail bondsman entity for receiving bond payments via the money transfer network, wherein the information includes account information for the bail bondsman entity and one or more documents required for providing bail by the court;

determining one or more requirements for posting of the bond amount by the bail bondsman entity, wherein the one or more requirements includes completion of the one or more documents required for providing bail by the court;

receiving an input indicating a monetary amount for funding the bond payment, wherein the monetary amount is received from a sending party;

validating that the one or more requirements are satisfied based on the information included in the request and the monetary amount, wherein the validating includes:

retrieving the one or more documents that are required for providing bail to be filled out in connection with providing the bond payment;

prompting a money transfer agent with a list of the one or more requirements:

determining whether the one or more documents have been filled out;

receiving input from the money transfer agent that the one or more requirements have been satisfied including that the one or more documents required for providing bail by the court have been filled out properly; and in response to a validation that the one or more requirements are satisfied:

initiating a money transfer transaction between the sending party and the bail bondsman entity, wherein the money transfer transaction provides the bond payment to an account of the bail bondsman entity indicated in the information of the database;

providing electronic copies of the one or more documents that have been filled out to the bail bondsman entity;

sending a notification and completed instances of the one or more documents required for providing bail to the bail bondsman entity, wherein the notification indicates the bond payment has been made, wherein the completed instances of the one or more documents are the one or more documents validated by the money transfer agent as having been filled out properly, wherein the bail bondsman entity initiates operations to release the defendant from custody in response to the notification; and generating a send receipt that includes information confirming the monetary amount used to fund the money transfer transaction, an amount of funds provided to the bail bondsman entity in connection with the money transfer transaction, one or more fees charged by the money transfer entity in connection with the money transfer transaction, a confirmation number identifying the money transfer transaction, and the case number, wherein the send receipt is provided to the sending party.

16. The non-transitory computer-readable storage medium of claim 15, wherein the monetary amount is less than the bail amount.

17. The non-transitory computer-readable storage medium of claim 15, wherein the one or more documents are retrieved from a database associated with the bail bondsman entity.

18. The non-transitory computer-readable storage medium of claim 15, the operations further comprising determining whether the bail bondsman entity indicated in the request is authorized to receive the bond payment via the money transfer network, wherein the request is denied in response to a determination that the bail bondsman entity indicated in the request is not authorized to receive the bond payment via the money transfer network, and wherein the money transfer transaction is processed in response to a determination that the bail bondsman entity indicated in the request is authorized to receive the bond payment via the money transfer network.

* * * * *